Figure 1:
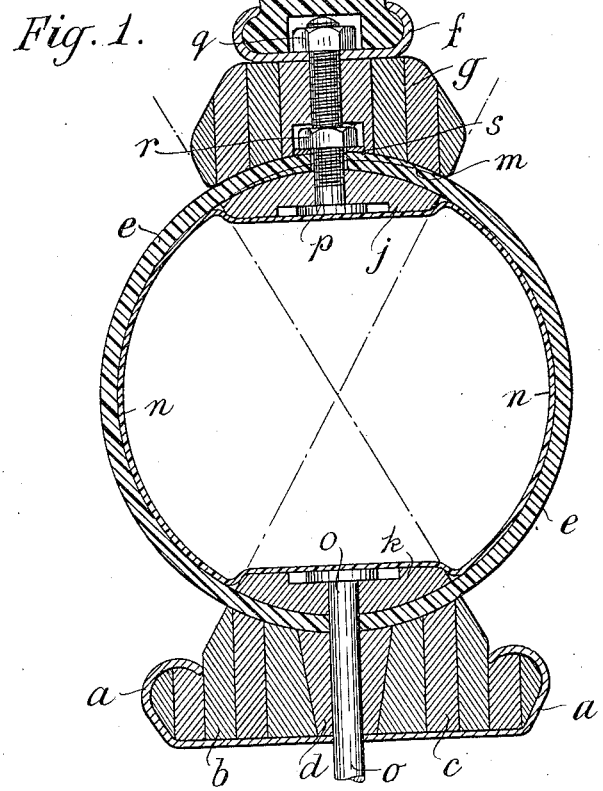

E. C. KINGSFORD, DEC'D.
P. A. KINGSFORD, EXECUTOR.
WHEEL OF VEHICLES.
APPLICATION FILED APR. 1, 1911.

1,046,804.

Patented Dec. 10, 1912.

WITNESSES:
John C. Sanders
Leon Spring

INVENTOR:
Edward Claude Kingsford
BY
ATT'Y.

UNITED STATES PATENT OFFICE.

EDWARD CLAUDE KINGSFORD, OF LONDON, ENGLAND; PHILIP ARTHUR KINGSFORD, OF FLIMWELL, ENGLAND, EXECUTOR OF SAID EDWARD CLAUDE KINGSFORD, DECEASED.

WHEEL OF VEHICLES.

1,046,804.        Specification of Letters Patent.        Patented Dec. 10, 1912.

Application filed April 1, 1911. Serial No. 618,453.

*To all whom it may concern:*

Be it known that I, EDWARD CLAUDE KINGSFORD, of "Carntyne," Shootup Hill, London, England, surgeon, have invented certain new and useful Improvements in and Relating to Wheels of Vehicles, of which the following is a specification.

This invention relates to tires for the wheels of vehicles of the type in which a tube, arranged to contain air, or indeed any other gas or liquid, is disposed between the rim of the wheel, and a continuous band of unstretchable and non-yielding material, which forms the tread, or with which the tread is incorporated.

The object of this invention is the production of an improved pneumatic tire which acts as a perfect shock absorber, and which is provided with a non-yielding hard tread, so that neither puncture, nor serious damage from road contact can occur.

In a tire constructed in accordance with this invention it is essential that the continuous band or tread should neither undergo deformity from its circular shape by reason of the weight of the vehicle transmitted to the wheel, nor, yield locally to road pressure and the elements are so designed, constructed and combined that it is capable of supporting varying weights with low internal air pressure without any alteration taking place in the concentricity of the rim and the tread, the pressure required being only that which is sufficient to render the rim and tread concentric in the absence of any superimposed load. To attain these ends the following conditions are necessary.

The various members of which the tire is composed are intimately and positively attached to each other, so that they constitute a continuous wall to the air chamber. For this purpose the flexible part, or parts are secured to the rim of the wheel and to the continuous tread respectively, by means of clamping rings which lie within the air chamber, or within the cover thereof. The pressure of the inclosed air is relatively low, not more than a few pounds per square inch above that of the atmosphere. The lower the pressure (above atmospheric pressure) the greater is the effective capability of the tire as a shock absorber; for, when relatively high pressure is employed, a considerable amount of road vibration is transmitted to the axle through the wall material which is rendered relatively tense by virtue of the high internal pressure.

The various members of which the air chamber is constructed are so proportioned that the width of the continuous tread, or of the tread bearing band, is equal to that of the rim of the wheel; and the area of the two taken together, is such that the mechanical force produced by the pressure of the inclosed air exerted upon them is equivalent to one-third of the whole force of the internal pressure. These conditions are fulfilled when the width of the two members is such that in transverse section, each subtends an angle of 60 degrees at the center. The force of the internal air pressure, exerted upon the rim and upon the tread, tends to separate them at every point, and the force exerted upon the flexible part of the wall increases the tension in its material. Since however, the flexible material is intimately attached to the rim of the wheel, and to the tread, along their respective peripheries, this tension is a force tending to draw them together at every point. The mechanical value of either of these forces is equal to that of the other and the two, operating in conjunction, maintain the tread in its position concentric with the wheel.

A tire made in accordance with this invention comprises the combination of a rim, a continuous band of unstretchable and non-yielding material, an air chamber disposed between the rim and continuous band, annular flexible members disposed between the rim and the band, said flexible members forming with the rim and band a cover to the air chamber, means for attaching the flexible members positively to the rim and to the band.

Figure 2:
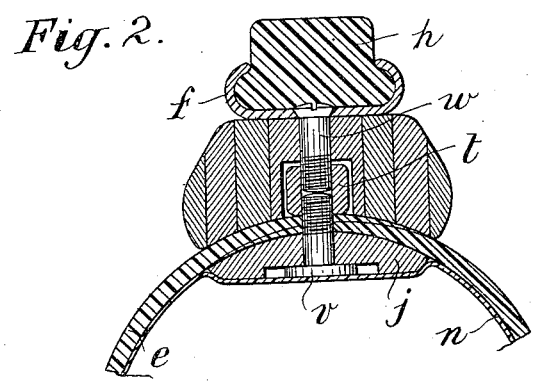

Figure 1 is a transverse section showing one form of tire made in accordance with this invention as applied to a wheel having a rim adapted for use with pneumatic tires of ordinary construction. Fig. 2 is a cross section showing a modified method of securing the parts together.

In the type shown in Fig. 1 the rim of the wheel is composed of a steel member $a$ and annular members $b$ $c$ and $d$ fashioned in wood and adapted to support the outer cover $e$ of the air chamber for one sixth of its circumference. The tread is composed of a steel rim $f$ and mounted on a rim $g$ fashioned in wood and adapted to support the outer cover $e$ of the air chamber for one sixth of its circumference.

$h$ is a ring of rubber or other suitable substance on which the wheel runs.

$j$ and $k$ are clamping members disposed within the tire.

The outer cover of the air chamber is provided with tapering edges which overlap as at $m$.

$n$ is the inner tube.

The annular members $b$ $c$ and $d$ of the rim are made in segments, the central member $d$ being slightly tapered for the purpose of wedging the side members $b$ and $c$ into position.

$o$ is one of a series of security bolts which pass through the clamping ring $k$, cover $e$, tapered segmental members $d$ and $e$ and steel rim $a$.

$p$ is one of a series of bolts which pass through the clamping ring $j$, cover $e$, wooden rim $g$ and steel rim $f$.

$q$ and $r$ are nuts on the bolt $p$.

$s$ is a washer.

In the method of attaching the tread to the cover shown in Fig. 2 the nut $t$ is first screwed on to the bolt $v$ and the bolt $w$ is screwed down into the nut $t$.

Any external force in the form of pressure or blow, applied to the tread, or to the wheel by means of the axle, tends to produce eccentricity of the two, but any external pressure is immediately transmitted to the column of inclosed air, by which it is equally distributed throughout. The value of the internal pressure thus induced is equivalent to that of the external force which originates it; and it is exerted with the intent of maintaining the concentric positions of the wheel and the tread; that is to say it is exerted in direct opposition to the external force.

When the tire is constructed in accordance with the conditions laid down, so that one third of the internal pressure is exerted upon the rim, and upon the tread in equal proportions, the mechanical value of the internal force, tending to maintain the concentric condition is, under all circumstances, equal to the mechanical value of the external force, tending to produce eccentricity, the one balances the other, and the tread can not be displaced from its concentric position by any external force applied to it or to the wheel. The tire maintains its symmetry under all conditions of road stress. It is therefore claimed that the apparatus acts as a real air-spring or instantaneous shock-absorber, whose limit as an absorber is only reached when the momentum in foot pounds of a blow equals or exceeds the product in foot pounds of the bursting strength of the fabric per square inch multiplied by the total internal area.

What I claim and desire to secure by Letters Patent is:—

A tire comprising the combination of a rim, a continuous band of unstretchable and non-yielding material, an air chamber disposed between the rim and continuous band, annular flexible members disposed between the rim and the band, said flexible members forming with the rim and band a cover to the air chamber which is circular in cross section, two annular clamping members disposed within the cover, one adapted to clamp the flexible sides to the rim and one to the continuous band, whereby the flexible member is divided into two sections, each about one third of the internal area of the whole cover.

In witness whereof, I have hereunto signed my name in the presence of two subscribing witnesses.

EDWARD CLAUDE KINGSFORD.

Witnesses:
REGINALD EATON ELLIS,
ROBERT MILTON SPEARPOINT.

Copies of this patent may be obtained for five cents each, by addressing the "Commissioner of Patents, Washington, D. C."